United States Patent [19]

Inaba et al.

[11] 4,176,091

[45] Nov. 27, 1979

[54] DENITRATING CATALYSTS HAVING POROUS COATING AND PROCESS FOR PRODUCING SAME

[75] Inventors: Hideya Inaba; Hisao Ogiyama; Masayoshi Ichiki; Yasumi Kamino; Nobuo Matsumoto; Kenichi Nagai; Masami Suzuki, all of Osaka, Japan

[73] Assignee: Hitachi Shipbuilding & Engineering Co., Ltd., Osaka, Japan

[21] Appl. No.: 927,096

[22] Filed: Jul. 24, 1978

[51] Int. Cl.² .................. B01J 21/08; B01J 23/26; B01J 23/22; B01J 23/72

[52] U.S. Cl. .................. 252/456; 252/454; 252/458; 252/459; 252/477 Q; 423/239; 427/309

[58] Field of Search .................. 252/477 Q, 454, 456, 252/458, 459; 427/309

[56] References Cited

U.S. PATENT DOCUMENTS

| | | | |
|---|---|---|---|
| 3,956,187 | 5/1976 | Betz | 252/477 Q |
| 4,040,981 | 8/1977 | Inaba et al. | 252/463 |

Primary Examiner—W. J. Shine
Attorney, Agent, or Firm—Armstrong, Nikaido, Marmelstein & Kubovcik

[57] ABSTRACT

A denitrating catalyst having a porous coating is produced by immersing a catalyst base of porous metal in a silica-containing coating bath, drying the catalyst base to form a carrier having a porous silica coating, immersing the carrier in a solution containing an active component and drying the resulting carrier to cause the carrier to support the active component thereon.

20 Claims, 7 Drawing Figures

DENITRATING CATALYSTS HAVING POROUS COATING AND PROCESS FOR PRODUCING SAME

BACKGROUND OF THE INVENTION

This invention relates to denitrating catalysts for use in a reaction in which nitrogen oxides ($NO_x$) in exhaust gases are selectively catalytically reduced with $NH_3$, and to a process for producing the catalysts.

Many processes for treating $NO_x$ in exhaust gases have already been proposed. Among these processes, the denitration process is most feasible in which nitrogen oxides are selectively catalytically reduced to harmless $N_2$ at a specified temperature with $NH_3$ in the presence of a catalyst. Although many catalysts have also been proposed for use in this process, they still remain to be improved. We prepared a catalyst from the porous metal material disclosed in U.S. Pat. No. 4,040,981 by immersing a catalyst base of the metal material in a silica-containing coating bath and drying the catalyst base to form a porous silica coating thereon. We found that the catalyst has high mechanical strength and retains sustained stable activity free of poisoining as by KCl. This invention relates to improvements in this catalyst.

SUMMARY OF THE INVENTION

A first object of this invention is to form silica coatings having improved porosity and therefore enhanced permeability to reaction gases. A second object of this invention is to provide denitrating catalysts having improved activity and satisfactory strength.

The denitrating catalysts of this invention having a porous coating are produced by immersing a catalyst base of porous metal in a coating bath comprising colloidal silica, drying the catalyst base to obtain a carrier having a porous silica coating, immersing the carrier in a solution containing an active component and drying the carrier to cause the carrier to support the active component thereon.

DESCRIPTION OF THE PREFERRED EMBODIMENTS

Figure 1:
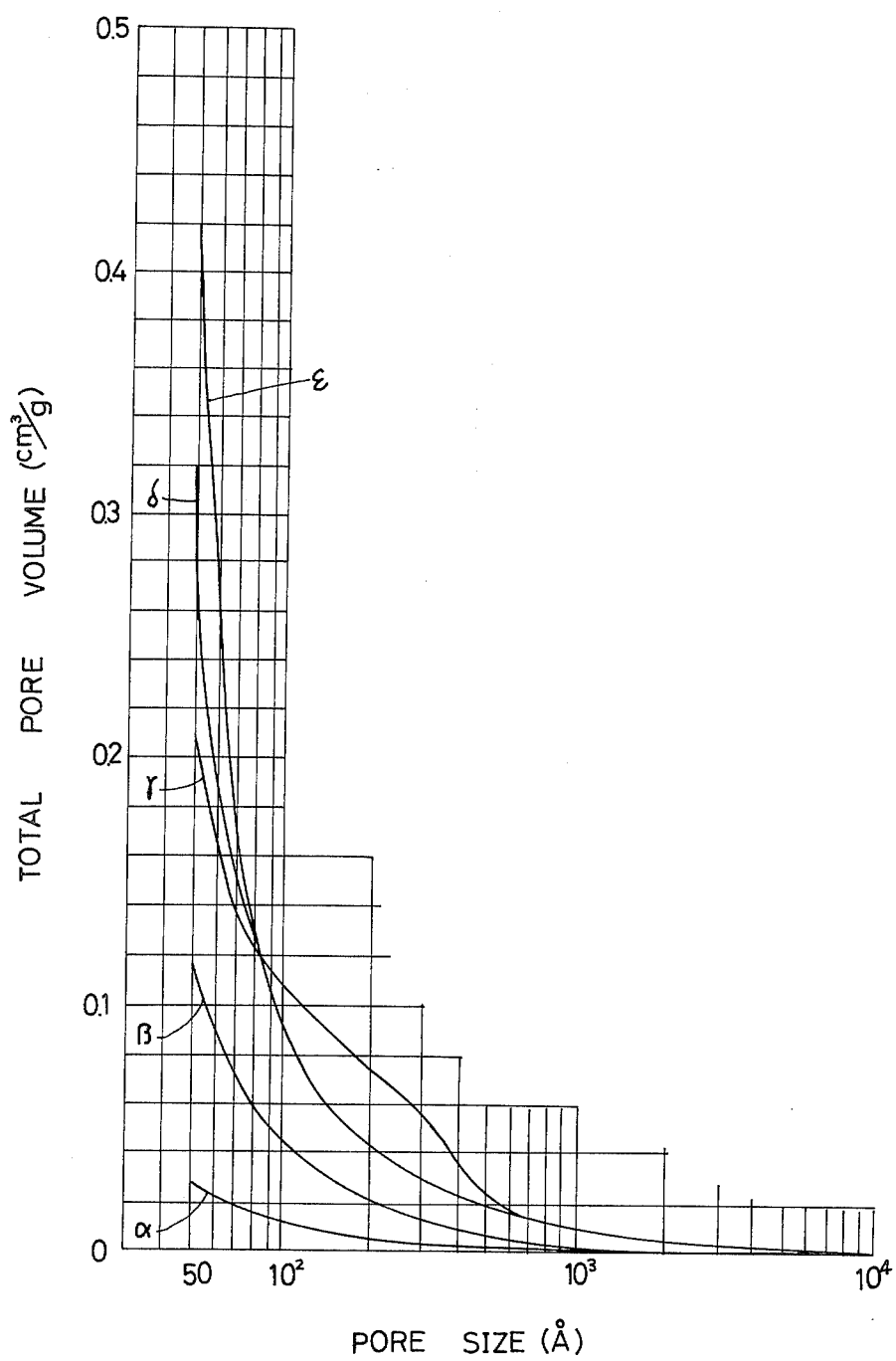
FIG. 1 is a graph showing the relation between the pore size and the total pore volume.

Examples of catalyst bases useful in this invention are those prepared from metal materials having an aluminum alloy surface layer by treating the materials with an aluminum dissolving solution to dissolve out aluminum and those obtained by etching the surfaces of metal materials to form porous rough surfaces thereon. Examples of useful metal materials are pure iron, iron-base alloys, steel, nickel, nickel-base alloys and copper-base alloys. Metal materials having an Al alloy surface layer are prepared for example by subjecting an Al-coated metal material to heat treatment. Al can be dissolved out from metal materials having an Al alloy surface layer by immersing such a material in an Al dissolving solution or by spraying the solution onto the material. Exemplary of useful Al dissolving solutions are aqueous solutions of alkali metal hydroxides such as NaOH, alkali metal carbonates, alkaline earth metal hydroxides and mineral acids. The Al dissolving treatment forms a porous surface layer on the metal material.

Preferably the porous metal material is subjected to oxidizing treatment and/or $SO_2$ treatment. Although the treating temperature, treating time and oxygen concentration for the oxidizing treatment are not particularly limited, it is preferable to treat the metal material in an atmosphere containing 0.1 to 20.8 vol. % of oxygen at room temperature to 400° C. for 0.1 to 20 hours. The $SO_2$ treatment is carried out preferably in an atmosphere containing at least 100 ppm of $SO_2$ at room temperature to 400° C. for 0.1 to 20 hours.

Colloidal silicas include alkaline colloids containing a large amount of alkali metal and acid colloids containing a smaller amount of alkali metal, among which the latter are preferable to use. Useful acid colloids have a pH of 3 to 4. The concentration and temperature of the coating bath, the time for which the catalyst base is immersed in the bath and the number of immersing procedures repeated are suitably determined so that the resulting coating will have the desired thickness. The immersed catalyst base is dried at a temperature of 50° to 150° C. Preferably the coating step is carried out with use of a colloidal silica containing 10 to 30 wt. % of $SiO_2$ as the coating bath by immersing the catalyst base in the bath at room temperature for about 10 minutes, withdrawing the base therefrom, drying the base at about 90° C. for one hour and repeating the immersing and drying procedures once to 6 times to obtain a coating of 7–20μ thickness.

When the coating step is conducted with use of a coating bath comprising a mixture of colloidal silica and an emulsion of high molecular weight substance by immersing the catalyst base in the bath, drying the wet base to form a coating thereon and baking the coated base, the resulting coating will have a greatly improved porosity. Examples of preferable high molecular weight substances are acrylic compounds which will not give any harmful gas during baking. The concentration of the high molecular weight substance in the coating bath is suitably determined in accordance with the desired mechanical strength, the component and particle size of the dust contained in the reaction gas. Preferably 10 to 50 parts by weight of the high molecular weight substance is used per 100 parts by weight of $SiO_2$ in the colloid. The coated base is baked in air at a temperature of 450° to 700° C., preferably 500° to 650° C., for 1 to 5 hours. The high molecular weight organic component is removed from the coated base by the baking step.

When a mixture of a colloidal silica, an emulsion of high molecular weight substance and a titanium compound is used as the coating bath, the resulting carrier will have improved properties, giving a catalyst of outstanding activity. Further a coating bath comprising a mixture of a colloidal silica, an emulsion of high molecular weight substances, a titanium compound and a tin compound, when used, gives a catalyst having high resistance to sulfuric acid. Examples of useful titanium compounds are water-soluble organic titanium compounds such as ammonium salt of Ti(OH)$_2$[OCH(CH$_3$)COOH]$_2$ and Ti[OC$_2$(NH$_4$)$_2$O$_3$]$_4$. Examples of useful tin compounds are organic tin compounds such as dibutyltin laurate. Such titanium compound and tin compound undergo thermal decomposition when baked, giving TiO$_2$ and SnO$_2$ respectively. Preferably the resulting coating contains 40 to 100 parts by weight of TiO$_2$ per 100 parts by weight of SiO$_2$, and 30 to 70 parts by weight of SnO$_2$ per 100 parts by weight of SiO$_2$.

Examples of solutions containing an active component useful for the immersion treatment of the carrier are solutions containing a vanadium compound such as vanadyl sulfate, vanadyl oxalate, ammonium metavanadate or the like; solutions containing a hydrolyzable titanate such as tetraisopropyl titanate; and solutions of a sulfate or halide of copper, iron or antimony, tungstate or chromate. When the carrier is immersed in such a solution, a V compound, Ti compound, Fe compound, Cu compound, Sb compound, W compound and/or Cr compound will be supported on the carrier.

The concentration and temperature of the solution, immersion time and like conditions are dependent on the amounts of active components to be supported on the carrier. Preferred amounts by weight to be supported on the carrier are 0.15 to 1.5% for V, 0.15 to 1.5% for Ti, 0.16 to 1.6% for Fe, 0.17 to 1.7% for Cu, 0.1 to 3.0% for Sb, 0.15 to 1.5% for W and 0.2 to 2.0% for Cr.

The catalysts thus obtained all have high denitrating activity. Especially the catalysts with a V compound and Ti compound supported thereon have still higher activity and in addition high resistance to sulfuric acid.

REFERENCE EXAMPLE 1

Measurement of the porosity of coatings

A colloidal silica (pH: 3.5) containing 22 wt. % of SiO$_2$ and three kinds of emulsions a, b and c of acrylic high molecular weight substance shown in Table 1 were mixed together in varying proportions to prepare 11 kinds of coating baths A, B, . . . , K. The bath A was free from any emulsion. The 11 baths were placed respectively into 11 stainless steel dishes of 5 cm in inside diameter to a depth of about 4 mm. Each of the baths was heated at 90° C. for one hour to remove the water, and the resulting solid was baked in air at 500° C. for one hour. The coating formed on the dish was separated therefrom, and the porosity of the coating was measured by a high-pressure mercury porosimeter. Table 2 shows the results.

Table 1

| Emulsion | Glass transition temperature (°C.) | Particle size (Å) |
| --- | --- | --- |
| a | −45 | 2000 |
| b | +25 | 400 |
| c | −55 | 2000 |

Table 2

| Bath | SiO$_2$ | High molecular weight substance Emulsion a | Emulsion b | Emulsion c | Total pore volume (cm$^3$/g) |
| --- | --- | --- | --- | --- | --- |
| A | 100 | — | — | | 0.028 |
| B | 94.7 | 5.3 | — | | 0.100 |
| C | 90 | 10.0 | — | | 0.119 |
| D | 81.8 | 18.2 | — | | 0.231 |
| E | 75 | 25.0 | — | | 0.319 |
| F | 82 | 13.2 | 5.0 | | 0.220 |
| G | 82 | 8.2 | 10.0 | | 0.210 |
| H | 94.7 | — | — | 5.3 | 0.083 |
| I | 90.0 | — | — | 10.0 | 0.190 |
| J | 75.0 | — | — | 18.2 | 0.432 |
| K | 90.0 | — | 5.0 | 5.0 | 0.127 |

The relation between the pore size and the total pore volume was determined on the coatings α, β, γ, δ and ε formed from the baths A, C, E, G and J. The results are shown in FIG. 1 which reveals that the coating α formed from the emulsion-free bath is somewhat lower in porosity but that the coatings formed from the emulsion-containing baths have a high porosity. Curve γ indicates that the use of the emulsion a composed of high molecular weight substance of low glass transition temperature gives coating pores which are predominantly 30 to 70 Å in pore size and which scarcely include pores at least 1000 Å in pore size and suited for the passage of the reaction gas through the coating. As represented by Curve δ, the emulsion b composed of high molecular weight substance of high glass transition temperature afforded a coating formed with a relatively large number of pores not smaller than 100 Å and having good gas permeability.

REFERENCE EXAMPLE 2 a. Preparation of carriers

Steel panels of SUS 304 (JIS), 2 mm×33 mm×50 mm, were immersed in a molten Al bath at 680° C. for 20 minutes to obtain steel panels coated with Al. Each of the panels was then heat-treated in a nitrogen gas atmosphere at 800° C. for one hour to cause Al to diffuse through the panel to form an Al alloy surface layer on the panel. The panel was then immersed in 200 ml of aqueous solution containing 10 wt. % of NaOH at 80° C. for 3 hours to dissolve out Al from the alloy to render the surface layer porous. Subsequently the steel panel was washed with water, dried in air and exposed to nitrogen gas containing 3 vol. % of oxygen at 300° C. for 3 hours to oxidize the porous surface layer. In this way, catalyst bases of porous steel were formed.

Some of the catalyst bases were immersed in the coating bath A prepared in Reference Example 1 at room temperature for 10 minutes, then withdrawn from the bath and dried at 90° C. for one hour. The immersing and drying procedures were repeated 3 times to form a 7- to 10- micron-thick porous silica coating on the bases. The resulting bases were then baked in air at 600° C. for one hour to remove the high molecular weight organic component, whereby a carrier (a) was obtained. In the same manner as above, carriers (c), (d), (g) and (j) were produced with use of coating baths C, D, G and J prepared in Reference Example 1.

b. Measurement of the strength of carriers

Figure 2:
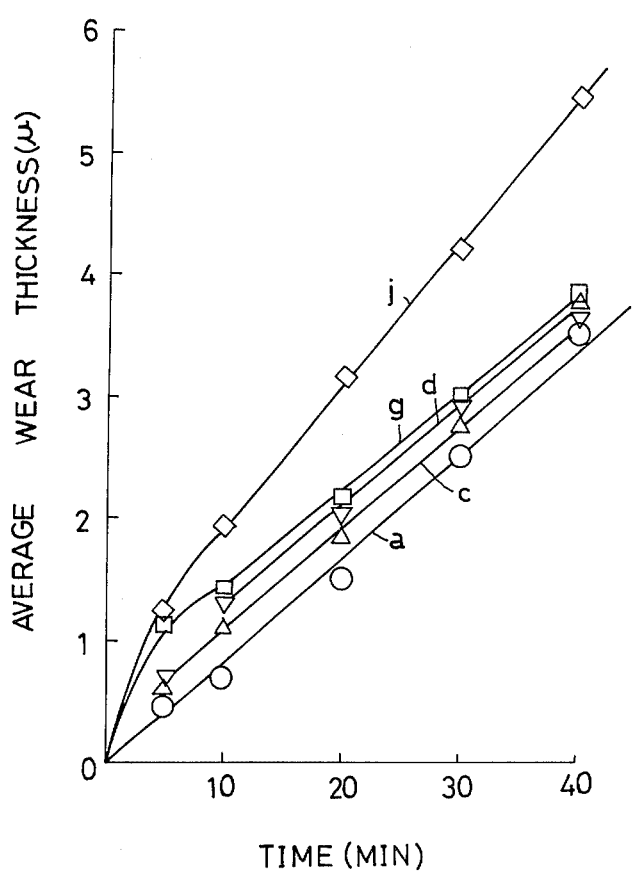
FIG. 2 is a graph showing the relation between the treating time and the average wear thickness.

The carrier (a) obtained was placed into a stirring container filled with silica gel crushed to 60-to 80-mesh sizes, and the silica gel was stirred to wear away the surfaces of pieces of carrier (a). Variations in the weight of the carrier (a) were measured at specified time interval to determine the average thickness of the carrier (a) worn away. The same procedure as above was repeated with use of the carriers (c), (d), (g) and (j) to determine the relation between the average wear thickness and the stirring time. The results are shown in FIG. 2. Generally wear resistance, namely mechanical strength, decreases with increasing porosity. FIG. 2 shows that the carriers (c), (d), (g) and (j) prepared with use of the emulsion-containing baths have higher porosity than the carrier (a) obtained with use of the emulsion-free bath and are nevertheless comparable thereto in strength.

EXAMPLE 1 a. Preparation of catalysts

Steel Raschig rings, 21 mm in diameter and 20 mm in height, were used as a material for the catalyst base. Six pieces of catalyst base were prepared by forming a porous layer on the rings in the same manner as in Reference Example 2. The mixture of the colloidal silica and the emulsion a used in Reference Example 1, ammonium salt of $Ti(OH)_2[OCH(CH_3)COOH]_2$, and a mixture of dibutyltin laurate and emulsion a were mixed together in varying proportions to prepare four kinds of coating baths L, M, N and O as listed in Table 3. Of the six pieces of catalyst base previously prepared, one was placed into each of the baths L and M, and two into each of the baths N and O. The pieces were thereafter subjected to repeated immersion-drying treatment and to baking step under the same conditions as in Reference Example 2 to form a porous coating on the pieces to obtain six carriers. The five carriers except for one obtained with use of the bath O were caused to support $TiO_2$ and/or $V_2O_5$. For the support of $TiO_2$, the carrier was immersed in liquid tetraisopropyl titanate at room temperature for 10 minutes, withdrawn therefrom, then allowed to stand in saturated water vapor at room temperature for 12 hours to hydrolyze the titanate and thereafter dried at 100° C. For the support of $V_2O_5$, the carrier was immersed in a solution of 1 mole of $NH_4VO_3$ in 1 liter of 15 vol. % aqueous solution of monoethanolamine at room temperature for 10 minutes and thereafter baked in air at 300° C. for one hour. For the support of both $TiO_2$ and $V_2O_5$, the carrier was made to support the former first. In this way, five catalysts l, m, n-1, n-2 and o-1 were obtained as listed in Table 3. The carrier having neither of these compounds supported thereon is also listed as a catalyst o-2.

Table 3

| Bath | Composition of bath (wt. parts) | | | | Active component supported (wt. pts.) | | Catalyst |
|---|---|---|---|---|---|---|---|
| | $SiO_2$ | $TiO_2$* | $SnO_2$* | Emul-** sion a | $TiO_2$ | $V_2O_5$ | |
| L | 100 | — | — | — | 2.3 | 5.5 | l |
| M | 82 | — | — | 18 | 2.3 | 5.5 | m |
| N | 57 | 25 | — | 18 | — | 5.5 | n-1 |
| N | 57 | 25 | — | 18 | 2.3 | 5.5 | n-2 |
| O | 57 | 11 | 14 | 18 | — | 5.5 | o-1 |
| O | 57 | 11 | 14 | 18 | — | — | o-2 (Comparison) |

*Calculated as the proportion of the metal oxide from the proportion of the corresponding organic metal compound used for the preparation of the bath.
**Proportion of the high molecular weight substance concerned.

b. Activity test

The catalysts were tested for activity with use of a quartz reactor tube of the flow type. The catalyst l was placed into the reactor tube fixed in position, and a test exhaust gas of the composition shown in Table 4 was passed through the reactor tube at a rate of 15 m/hr per unit geometric surface area of the catalyst.

Table 4

| Component of gas | Proportion (vol. %) |
|---|---|
| NO | 0.02 |
| $SO_2$ | 0.02 |
| $NH_3$ | 0.02 |
| $O_2$ | 5.0 |
| $H_2O$ | 10.0 |
| $CO_2$ | 10.0 |
| $N_2$ | Balance |

Figure 3:
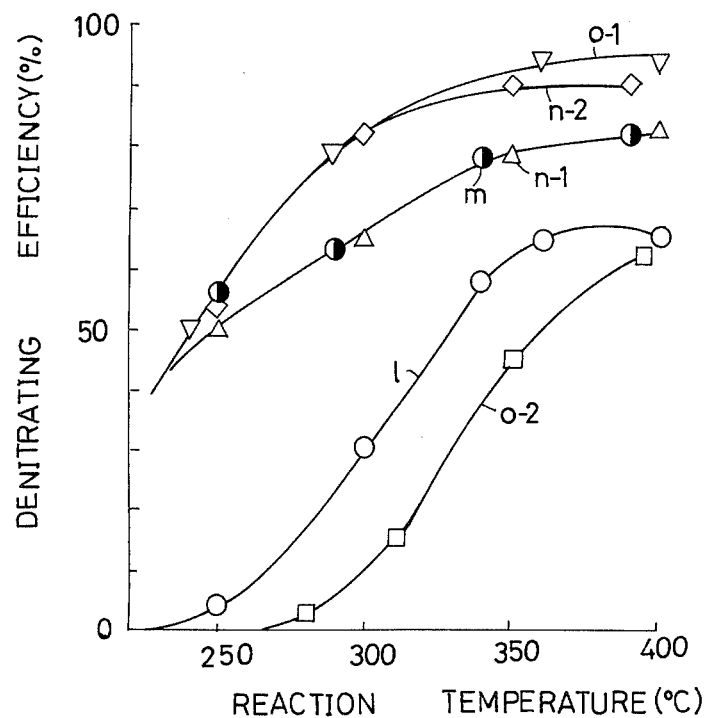
FIGS. 3 and 4 are graphs each showing the relation between the reaction temperature and the denitrating efficiency.

Denitration efficiency was calculated from the difference between the NO concentration at the inlet of the reactor tube and that at the outlet thereof. The same procedure was repeated at varying reaction temperatures to determine denitration efficiencies at the temperatures. Similarly denitration efficiencies were determined with used of the catalysts m, n-1, n-2, o-1 and o-2. FIG. 3 showing the results reveals that the catalysts incorporating $V_2O_5$ all have high activity. Particularly high activity is available with the catalysts composed of a carrier prepared with use of the emulsion-containing coating bath and having $V_2O_5$ supported on the carrier.

Figure 4:
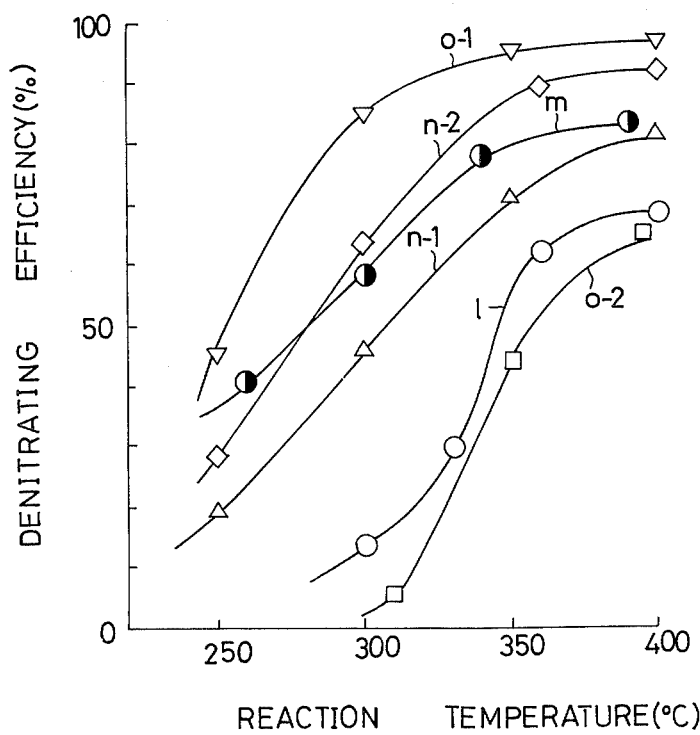

The catalysts obtained in this example were exposed to air containing 4000 ppm of sulfuric acid vapor at 400° C. for 2 hours and were thereafter tested for denitration efficiency in the same manner as above. The results are shown in FIG. 4. Comparison between FIG. 3 and FIG. 4 indicates that the catalysts l, m, n-1, n-2 and o-2 exhibit somewhat reduced activity at temperatures of not higher than 350° C., whereas the catalyst o-1 incorporating $SnO_2$ in the coating retains high activity and has high resistance to sulfuric acid.

EXAMPLE 2 a. Preparation of catalysts

A number of pieces of the same catalyst base as used in Example 1 were immersed in the same coating bath 0 as used in Example 1 and subsequently dried, each a different number of times. The pieces were thereafter baked and caused to support $V_2O_5$ in the same manner as in Example 1 to prepare many catalysts having varying coating thicknesses.

b. Relation between coating thickness and denitration efficiency.

Figure 5:
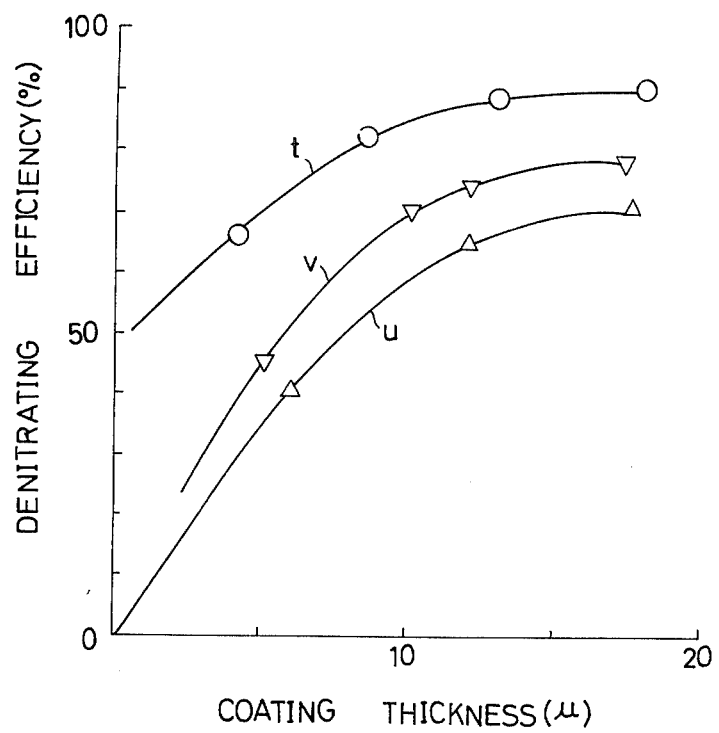
FIG. 5 is a graph showing the relation between the coating thickness and the denitration efficiency.

The catalysts were tested for denitration efficiency at 300° C. under the same conditions as in Example 1 to determine the relation between the coating thickness and the denitration efficiency. Curve t in FIG. 5 represents the results.

In the same manner as above the relation between the coating thickness and denitration efficiency was determined with use of cordierite Raschig rings and alumina Raschig rings of the same shape as used in Example 1. Curves u and v in FIG. 5 represent the results. FIG. 5 indicates that the denitration efficiency increases with increasing coating thickness but that little or no improvement is achieved with coating thicknesses of 20μ or larger. Comparison between curve t and Curves u, v reveals that the catalyst base of porous steel per se has noticeable denitrating activity.

EXAMPLE 3 a. Preparation of catalysts

Ten pieces of catalyst base were prepared in the same manner as in Reference Example 2 except that a steel material SS 41 (JIS) was used. The pieces were coated under the same conditions as in Reference Example 2 with use of the coating bath L prepared in Example 1 to obtain ten carriers.

Of these carriers, one was immersed in 200 ml of 2 N oxalic acid solution of $NH_4VO_3$ (1.0 mole/liter) at room temperature for 30 minutes, then withdrawn from the solution and thereafter dried at 100° C. for one hour to obtain a V-incorporating catalyst.

Another carrier was immersed in a n-butyl alcohol solution of tetra-n-butyl titanate (1.5 moles/liter) under the same conditions as above and dried under the same conditions to prepare a catalyst having Ti incorporated therein.

The remaining eight carriers were treated in the same manner as above with use of the titanate solution at varying concentrations as shown in Table 5 to cause the carriers to support Ti. Subsequently the resulting carriers were similarly treated with use of the same metavanadate solution as above at the varying concentrations listed in Table 5 to cause the carriers to support V. Thus eight catalysts were prepared which incorporated both Ti and V. b. Activity test The catalysts were tested for denitration efficiency at 350° C. in the same manner as in Example 1. The catalysts were treated with sulfuric acid vapor in the same manner as in Example 1 and thereafter tested for denitration efficiency. Table 5 also shows the results.

The catalysts were tested for denitration efficiency at 300° C. and 350° C. in the same manner as in Example 1 except that the gas was passed at a rate of 24 m/hr per unit geometric surface area of the catalyst. Table 6 shows the results.

Table 6

| Soln. | Metal salt : Concn. (mole/liter) | | Denitration efficiency (%) | |
|---|---|---|---|---|
| | | | 300° C. | 350° C. |
| (A) | $FeSO_4$ | 0.5 | 42 | 65 |
| (B) | $CuSO_4$ | 0.5 | 45 | 65 |
| (C) | $CuCl_2$ | 0.5 | 59 | 71 |
| | $SbBr_4$ | 0.25 | | |
| (D) | | | 65 | 83 |
| | $FeBr_2$ | 0.25 | | |
| (E) | $SbBr_4$ | 0.5 | 40 | 60 |
| | $NH_4WO_3$ | 0.25 | | |
| (F) | | | 54 | 79 |
| | $FeSO_4$ | 0.25 | | |
| | $(NH_4)_2Cr_2O_7$ | 0.25 | | |
| (G) | | | 68 | 87 |
| | $Fe_2SO_4$ | 0.25 | | |

As apparent from Table 6, the catalysts have increased activity at higher temperatures.

EXAMPLE 5 a. Preparation of catalysts

Four pieces of the same catalyst base as formed in Reference Example 2 with a porous surface layer and the four kinds of coating baths 1 to 4 listed in Table 7

Table 5

| Active component in catalyst | Conc. of titanate (mole/liter) | concn. of $NH_4VO_3$ Ti (g/m$^2$) | Amount of active component* | | Denitration efficiency |
|---|---|---|---|---|---|
| | | | Calcd. as V (g/m$^2$) | Calcd. as (%) | |
| V | — | 1.0 | — | 7.5 | 82.1 (58.1)** |
| Ti | 1.5 | — | 8.1 | — | 80.0 (64.0) |
| Ti + V | 0.5 | 1.0 | 3.2 | 4.4 | 77.5 (75.2) |
| " | 1.0 | 1.0 | 4.6 | 4.0 | 82.4 (74.0) |
| " | 1.5 | 0.1 | 8.0 | 1.3 | 85.2 (83.0) |
| " | 1.5 | 0.25 | 7.6 | 1.8 | 83.2 (81.5) |
| " | 1.5 | 0.5 | 8.3 | 2.6 | 78.0 (78.0) |
| " | 1.5 | 1.0 | 8.1 | 4.2 | 80.0 (75.0) |
| " | 2.0 | 1.0 | 9.4 | 3.9 | 86.2 (74.0) |
| " | 3.0 | 1.0 | 13.0 | 4.5 | 86.0 (78.0) |

*The amount of active component supported on the carrier, as expressed in weight per unit geometric surface area of the catalyst.
**The value in the parentheses is the denitration efficiency achieved after the catalyst was treated with sulfuric acid vapor.

Table 5 shows that the catalysts incorporating both the Ti compound and V compound have higher activity than those containing only one of them and are more resistant to sulfuric acid.

EXAMPLE 4 a. Preparation of catalysts

Seven pieces of the same catalyst base as used in Reference Example 2 with a porous surface layer and the coating bath 0 prepared in Example 1 were used to obtain seven carriers in the same manner as in Reference Example 2. The carriers were respectively immersed in the metal salt-containing solutions (A) to (G) shown in Table 6 at room temperature for 10 minutes, then dried at 100° C. for one hour and further baked at 300° C. for one hour to obtain a catalyst incorporating Fe, catalysts incorporating Cu, catalyst incorporating Sb, catalyst incorporating Sb and Fe, catalyst incorporating W and Fe and catalyst incorporating Cr.

b. Activity test and prepared in the same manner as in Reference Example 2 were used to obtain four carriers in the same manner as in Reference Example 2. Table 7 also shows the compositions of the coatings formed on the pieces.

Table 7

| | Composition of bath (wt. %) | | | | Composition of coating (wt. %) | | |
|---|---|---|---|---|---|---|---|
| Bath | $SiO_2$ | $TiO_2$* | $SnO_2$* | Emul-** sion a | $SiO_2$ | $TiO_2$ | $SnO_2$ |
| 1 | 57 | 11 | 14 | 18 | 69.5 | 13.4 | 17.1 |
| 2 | 57 | 15 | 10 | 18 | 69.5 | 18.3 | 12.2 |
| 3 | 57 | 7 | 18 | 18 | 69.5 | 8.5 | 22.0 |
| 4 | 57 | 20 | — | 18 | 74.0 | 26.9 | — |

*The same as in Table 3.
**The same as in Table 3.

Aqueous solutions of $NH_4VO_3$ having varying concentrations of 50 to 1000 mg/liter calculated as V were prepared, and the carriers were made to support V with use of the solutions in the same manner as in Example 4 to determine the relation between the V compound concentration of the solution and the amount of V supported on the carrier per unit amount of adsorbed substances in the coating. The amount of V supported is expressed by:

$$\frac{\text{Weight of }V\text{ supported on carrier}}{\text{Weight of coating} \times (\text{TiO}_2 \text{ content} + \frac{1}{2} \text{SnO}_2 \text{ content})}$$

Figure 6:
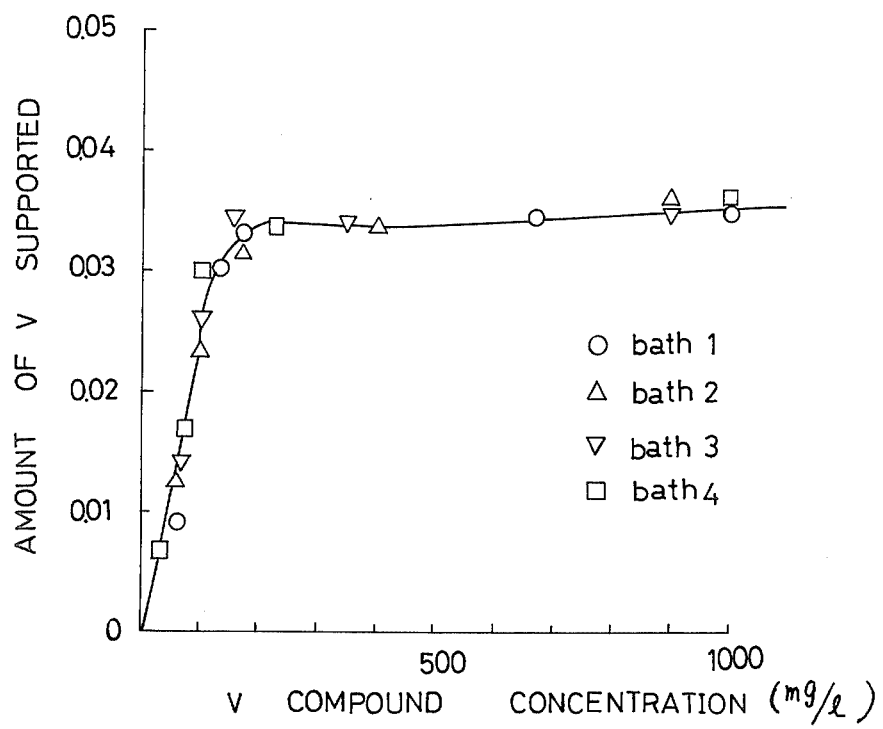
FIG. 6 is a graph showing the relation between the concentration of V compound and the amount of V supported on the carrier per unit amount of the adsorbed substances.

The results are shown in FIG. 6, which shows that the V compound is strongly adsorbed on the coating, with an increasing amount supported on the carrier with the increase in V concentration.

b. Activity test

Figure 7:
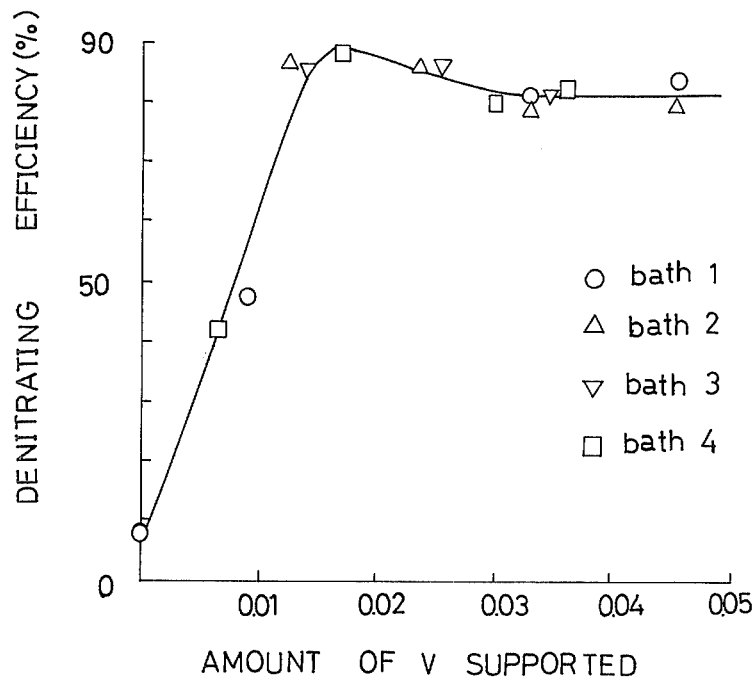
FIG. 7 is a graph showing the relation between the denitrating efficiency and the amount of V supported on the carrier per unit amount of the adsorbed substances.

The catalysts were tested for denitration efficiency at 300° C. in the same manner as in Example 1 to determine the relation between the denitrating efficiency and the amount of V supported on the carrier per unit amount of the adsorbed substances in the coating. The results are given in FIG. 7, which reveals that the denitration efficiency increases with the increase in the amount of V supported per unit amount of adsorbed substances and reaches the highest level when the latter is in the range of 0.01 to 0.02 which corresponds to 0.15 to 1.5% in terms of the weight of V.

What is claimed is:

1. A process for producing a denitrating catalyst comprising the step of forming a carrier having a porous silica coating by immersing a catalyst base of porous metal in a silica-containing coating bath and drying the base, and the step of causing the carrier to support an active component thereon by immersing the carrier in a solution containing the active component and drying the resulting carrier.

2. A process as defined in claim 1 wherein the porous catalyst base is formed by treating a metal material having an aluminum alloy surface layer with an aluminum-dissolving solution to dissolve out aluminum.

3. A process as defined in claim 1 wherein the coating bath is an acid colloidal silica.

4. A process as defined in claim 1 wherein the coating bath is a mixture of colloidal silica and containing an emulsion of high molecular weight organic compound, and the base is baked after having been immersed in the bath and dried.

5. A process as defined in claim 4 wherein the high molecular weight organic compound is contained in an amount of 10 to 50 parts by weight per 100 parts by weight of $SiO_2$.

6. A process as defined in claim 4 wherein the coating bath is a colloidal silica containing a titanium compound.

7. A process as defined in claim 6 wherein the content of the titanium compound calculated as $TiO_2$ is 40 to 100 parts by weight per 100 parts by weight of $SiO_2$.

8. A process as defined in claim 5 wherein the coating bath is a colloidal silica containing a tin compound.

9. A process as defined in claim 8 wherein the content of the tin compound calculated as $SnO_2$ is 30 to 70 parts by weight per 100 parts by weight of $SiO_2$.

10. A process as defined in any one of claims 1 to 4 wherein the active component is a vanadium compound.

11. A process as defined in claim 10 wherein the vanadium compound is supported on the carrier in an amount of 0.15 to 1.5% by weight calculated as V.

12. A process as defined in any one of claims 1 to 9 wherein the active component is a mixture of a vanadium compound and a titanium compound.

13. A process as defined in any one of claims 1 to 9 wherein the active component is a compound selected from the group consisting of sulfates and halides of iron, copper and antimony, tungstates and chromates.

14. A process as defined in any one of claims 1 to 9 wherein the coating has a thickness of 7 to 20$\mu$.

15. A denitrating catalyst having a porous coating and produced by the process of any one of claims 1 to 9.

16. A denitrating catalyst having a porous coating and produced by the process of claim 10.

17. A denitrating catalyst having a porous coating and produced by the process of claim 11.

18. A denitrating catalyst having a porous coating and produced by the process of claim 12.

19. A denitrating catalyst having a porous coating and produced by the process of claim 13.

20. A denitrating catalyst having a porous coating and produced by the process of claim 14.

* * * * *